Nov. 16, 1965 W. E. WHITNEY 3,217,832
SOUND AND SHOCK ABSORBING ADHESIVE TAPE
Filed May 13, 1965

INVENTOR.
WAYNE E. WHITNEY
BY
RONALD E. BARRY

Attorney

United States Patent Office 3,217,832
Patented Nov. 16, 1965

3,217,832
SOUND AND SHOCK ABSORBING
ADHESIVE TAPE
Wayne E. Whitney, Milwaukee, Wis., assignor to Thiem
Products, Inc., Milwaukee, Wis.
Filed May 13, 1965, Ser. No. 455,384
6 Claims. (Cl. 181—33)

This invention relates to the sound isolation and vibration dampening of the component parts of automotive vehicles and more particularly to a novel tape for isolating the sound and vibration of the gasoline tank for such vehicles.

The primary object of the present invention is to provide a layered tape which can be attached to the gasoline tank of an automotive vehicle to insulate the sound from the tank.

Another object of the present invention is to provide a layered tape which can be simply and easily attached to a gasoline tank to dampen any vibrations between the tank and the automobile.

A further object of the present invention is to provide a laminated tape for isolating the sound and vibration of a component of a vehicle which is sufficiently tacky for ease of attachment to the tank during assembly.

Still another object of the present invention is to provide an isolating and insulating tape for the component parts for a vehicle which has low moisture absorptive properties to thereby prevent corrosion and rusting of the metals.

A still further object of the present invention is to provide an improved sound and vibration dampening tape which can be subjected to considerable pressure without any substantial loss in its dampening effect.

Still another object of the present invention is to provide a sound and vibration insulating tape in which the adhesive material cannot be squeezed off of the tape by the application of pressure to the tape.

These objects are accomplished by coating a woven webbing strip of plastic material with a layer of visco elastic, tacky, filled composition. This material has good sound insulating properties as well as good vibration properties. Where sound insulating is of prime importance, the mastic composition can be readily decreased in density and where vibration dampening is of prime importance, the density can be increased accordingly. Strips of rubber or other low sound media may be embedded within the mastic composition to act as a stop to prevent squeezing of the mastic composition when the tape is placed between the tank and the frame of the automobile.

Other objects and advantages will become more readily apparent from the following detailed description when read in connection with the accompanying drawings, in which.

Figure 1:
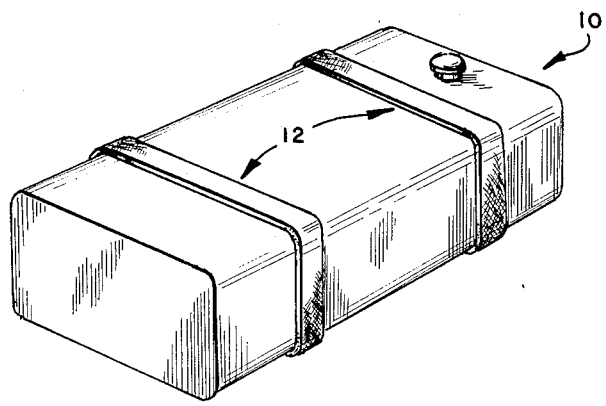
FIG. 1 is a view of an automobile gas tank with the improved tape wrapped around each end.
Figure 2:
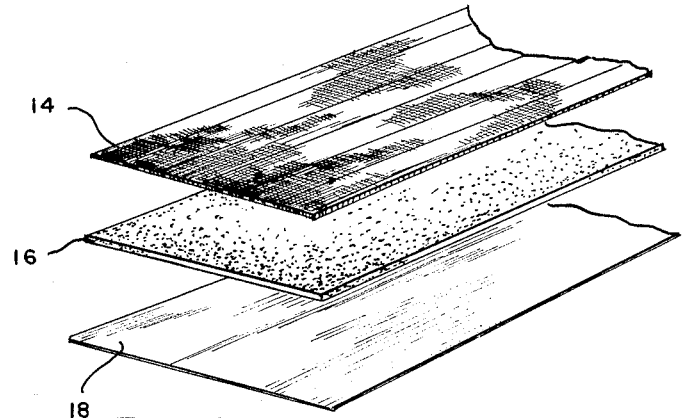
FIG. 2 is an exploded view of the tape and mastic material.

Referring more particularly to the drawings, a gas tank 10 is shown for an automobile. These tanks are generally mounted in the rear of the auto in tight engagement with the frame of the auto. With a metal-to-metal contact between the gas tank and the frame of the automobile, any sound or vibration in the gas tank will be transferred to the body frame.

To prevent this, two strips of tape 12 are wrapped around the ends of the tank to act as spacers as well as to dampen any sound or vibration between the gas tank and the frame of the automobile.

The tape is made by extruding a one-quarter inch layer 16 of mastic material onto a strip of removable paper 18. As the paper with the mastic material is moved along by a conveyor, a strip of woven webbing 14 is pressed against the mastic material. The woven webbing strip 14 is made from any of the known webbing materials such as polypropylene, polyethylene, nylon, saran, or the like. The mastic material is sufficiently tacky so that it will adhere readily to both the paper and the flexible webbing strip. When the paper is removed, the exposed tacky mastic material is placed against the side of the gas tank and is protected by the woven webbing material.

The following composition is set forth as an example of a mastic composition which can be used in the present invention but it should be remembered that there are other compositions which could be used as well. In the example, the mastic composition included 15%–20% by weight of a visco elastic, tacky adhesive binder composed of 30% polybutene mixed with 70% petroleum oil.

This adhesive binder was then mixed with a combination of barytes, asbestos fibers, aluminum stearate and myristic acid and lampblack. The barytes is used to provide mass, the asbestos fibers for strength, the aluminum stearate and myristic acid as wetting agents, and the lampblack for color. These ingredients are combined in the following percentages by weight of the final composition:

| | Percent |
|---|---|
| Binder | 15–20 |
| Barytes | 60–70 |
| Asbestos fibers | 15–20 |
| Aluminum stearate | .80–.90 |
| Myristic acid | .05–.1 |
| Lampblack | .1–.3 |

This composition will be sufficiently tacky to adhere to the outer surface of the tank and has sufficient mass density to withstand considerable force without being squeezed out of the space between the strip and the tank.

Where it is considered necessary to provide a composition having increased vibration dampening characteristics, the density or mass of the mastic layer can be increased by increasing the barytes to 75% by weight and adding lead shot or other high density fillers.

If sound isolation or sound insulation is to be achieved, the mass density of the mastic composition should be reduced with a corresponding increase in the fibrous fillers. The barytes could thus be reduced to 50% by weight and the asbestos increased to 30% by weight. This could also be accomplished by the addition of soft or cellular fillers to the mastic composition.

Figure 3:
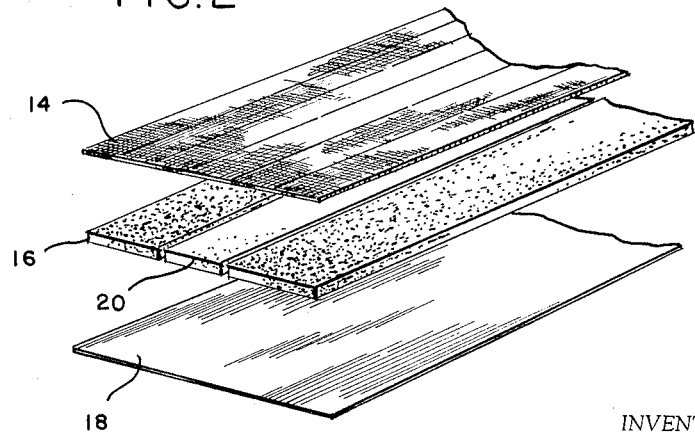
FIG. 3 is an exploded view of the tape and mastic material with a strip of rubber embedded in the mastic.

In manufacturing the strip, as indicated above, the mastic composition is extruded onto a removable type paper backing to a thickness of 1/8" to 1/4". The woven webbing is then pressed against the mastic composition so that it becomes embedded therein. The mastic composition has sufficient density to resist the normal squeezing effect when the tank is mounted on the auto. If an excessive amount of squeezing is contemplated, a rubber strip 20 as shown in FIG. 3 is embedded within the mastic composition along its longitudinal axis. Rubber is shown but it should be remembered that any low sound transmission material could be used as long as it is compatible with the mastic composition. Rubber strips could also be located along each edge of the woven strip with the mastic composition located in the center.

Although only a few embodiments of the present invention have been shown and described, it should be apparent that various changes and modifications can be made herein without departing from the scope of the appended claims.

What is claimed is:
1. A sound and vibration insulating adhesive tape consisting of
   an elongate base of woven plastic material selected from the group consisting of polypropylene, polyethylene, nylon or saran, and
   a strip of adhesive material applied to one side of said base to a thickness of approximately ¼", said adhesive material consisting essentially of a mixture by weight of 50%–75% barytes, 15%–20% reinforcing fibers, .75%–1.0% wetting agent, and 15%–20% of a visco tacky, adhesive binder.

2. A sound and vibration insulating adhesive tape consisting of
   an elongate strip of woven plastic material selected from the group consisting of polypropylene, polyethylene, nylon or saran,
   a strip of solid flexible material of less width than the elongate strip and centrally disposed on one side of said elongate strip, and
   strips of adhesive material disposed on said elongate strip on each side of said solid flexible material, said adhesive material consisting essentially of a mixture by weight of 50%–75% barytes, 15%–20% reinforcing fibers, .75%–1.0% wetting agent, and 15%–20% of a visco tacky, adhesive binder.

3. A sound and vibration dampening tape comprising an elongate strip of woven plastic material and
   a layer of mastic material approximately ⅛" to ¼" thick on one side of said strip, said mastic material consisting essentially of a mixture by weight of 60%–70% barytes, 15%–20% reinforcing fibers, .75%–1.0% wetting agents, and 15%–20% of a visco tacky, adhesive bonder.

4. A sound and vibration dampening tape according to claim 3 including a rubber strip embedded in said mastic material along the longitudinal axis of said strip, said rubber strip having a thickness substantially equal to the thickness of said mastic composition.

5. A sound and vibration insulating adhesive tape for the fuel tank on an automobile, comprising
   a strip of woven plastic material of a predetermined length,
   a layer of adhesive material applied to one side of the strip to a thickness of approximately ¼", said adhesive material including by weight 60%–70% of barytes, 15%–20% of reinforcing fibers, 0.75%–1.0% wetting agent, and 15%–20% of a visco tacky, adhesive binder.

6. A tape according to claim 5 including at least one rubber strip of less width that the plastic material embedded in said adhesive material and having a thickness approximately equal to the thickness of the adhesive material.

References Cited by the Examiner
UNITED STATES PATENTS

| | | | |
|---|---|---|---|
| 2,057,251 | 10/1936 | Seigle | 181—33.1 |
| 2,439,481 | 4/1948 | Martin | 260—33.6 |
| 3,061,491 | 10/1962 | Sherrard et al. | 181—33.11 |
| 3,112,283 | 11/1963 | Hansen et al. | 260—17.4 |
| 3,193,049 | 7/1965 | Wollek | 181—33.1 |

LEO SMILOW, *Primary Examiner.*